3,539,931
CURRENT-FREQUENCY CONVERTER WHEREIN OUTPUT FREQUENCY IS PROPORTIONAL TO THE SQUARE ROOT OF THE INPUT CURRENT
Philippe Jouve, Pontacq, France, assignor to Societe Anonyme dite: Societe Nationale des Petroles d'Aquitaine, a corporation of France
Filed Feb. 13, 1968, Ser. No. 705,080
Claims priority, application France, Feb. 16, 1967, 95,258
Int. Cl. G06g 7/12
U.S. Cl. 328—144         2 Claims

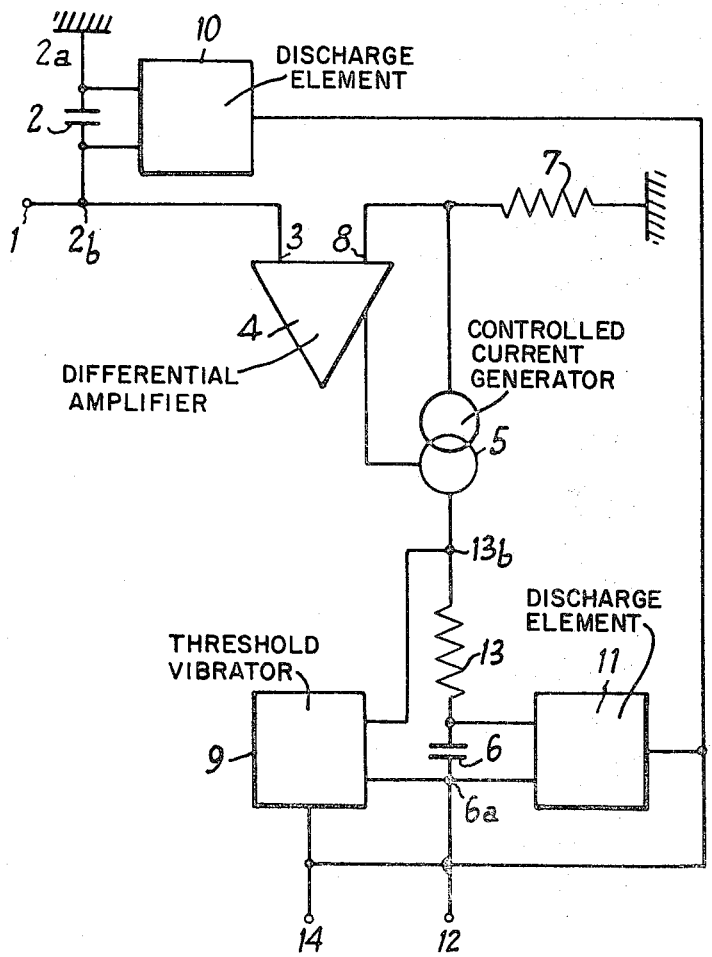

ABSTRACT OF THE DISCLOSURE

This invention relates to a current-frequency converter which provides impulses at a frequency proportional to the square root of the current applied at the input of the device and which comprises a condenser, a voltage converter, a second condenser, circuit elements for measuring the charging voltage of the said second condenser and circuit elements for effecting the simultaneous discharge of the two condensers.

---

The present invention concerns a current-frequency converter providing impulses at a frequency proportional to the square root of the current applied at the input of the device.

Converters have been proposed hitherto, which provide an impulse frequency proportional to the voltage or current applied at the input to the equipment.

In many instances, and in particular in dealing with the measurement of output or flow, the signal provided (and in particular the signal provided by the measuring instrument) is proportional to the square of the quantity to be measured. Thus, for example, when measuring flow with the help of a pressure-producing member, the differential pressure caused by the pressure-producing member is measured and this differential pressure is proportional to the square of the flow. It has been necessary hitherto to employ a separate square-root extractor, coupled to a voltage-frequency converter, when it is required to process these data numerically so as to obtain the flow.

The present invention provides a substantial improvement in that it makes it possible to employ only a single item of apparatus, the accuracy of which can be considerably greater than the accuracy which can be obtained when using two coupled items of apparatus.

The device provided by the present invention includes either a condenser through which the current passing from a measuring apparatus is caused to flow or if the measuring apparatus supplies a voltage, a voltage-converter connected to one of the inputs of a differential amplifier, the second input of which is connected to a resistor across the terminals of which there occurs a voltage proportional to the voltage derived from the measuring apparatus, the said proportional voltage being established by a current provided by a servo-current generator located at one of the outputs of the amplifier, a second condenser being provided which is fed by the said current generator, a threshold trigger being connected across the terminals of the second condenser and at least one discharge circuit element being provided to effect simultaneously the discharge of the two condensers, when the trigger detects a given voltage level.

In a preferred form of the device provided by the invention, the circuit constituted by the second condenser and the trigger contains a high-value resistor, calibrated in such manner that the product of the resistance of this resistor and the capacitance of the second condenser is equal to the time necessary for the discharge of the second condenser, which time is determined by the characteristics of the current element which controls discharge of the said second condenser.

The invention will be better understood from the following description of one particular form of the equipment according to the invention, given by way of example only, with reference to the accompanying drawing.

The single figure of the drawing shows the circuit diagram for the said form of equipment according to the invention.

Referring to the drawing, an input terminal 1 has applied thereto the current received from a measuring instrument; 2 is the input condenser; the input terminal 3 of a differential amplifier 4 is connected to the terminal 2b of the condenser 2; 5 is a servo-current generator; 6 is a second condenser charged by the generator 5; current supplied by the generator 5 produces a certain voltage across a resistor 7 and this is applied to the second input 8 of the differential amplifier 4; 13 is a suitable resistance in series with the capacitor 6, through which the current supplied by the generator 5 passes. The terminal 13b of the resistance 13 is connected to a threshold trigger 9, the other terminal of the latter being connected to the terminal 6a of the condenser 6. This trigger 9 supplies an impulse when the voltage across the terminal 13b of the resistor 13 and the terminal 6a of the condenser 6 reaches a certain value. The impulses supplied by the threshold trigger 9 are used to control two discharge elements 10 and 11 connected across, respectively, the condenser 6 and the condenser 2.

Components 5, 9, 10 and 11 are described in "Junction Transistor Electronics" by R. B. Harley, John Wiley, 1963. The current generator 5 is described on page 142, trigger 9 is described on page 423 and discharge elements 10 and 11 are described on page 413.

The equipment is supplied with a constant voltage at the terminal 12 while the impulses emitted by the threshold trigger 9 are received at 14.

The mode of operation of such a system can be outlined as follows. The current applied at 1 charges the capacitor 2. The voltage across the terminals of this capacitor increases linearly as a function of time and at the terminal 2b there is thus available a linearly increasing voltage which is applied to the input 3 of the differential amplifier 4. This increasing voltage controls the current generator 5 which thus supplies a current which is linearly variable as a function of time. This current provides for the charging of the condenser 6, across the terminals of which a voltage is established which is the result of this condenser being charged by the variable current; from this there results a voltage across the terminals of the capacitor 6 which is variable as a function of time, in accordance with a parabolic law. The voltage occurring between the terminal 13b of the resistor 13 and the terminal 6a of the condenser 6 is compared by the threshold trigger 9 with the constant regulated voltage applied to the terminal 12.

The threshold trigger 9 determines when the parabolically varying voltage is equal to the reference voltage. This response of the trigger 9 is translated into the emission of an impulse which triggers the discharge elements 10 and 11 of the capacitors 2 and 6; these elements 10 and 11 may be, for example, transistors of which the control electrodes are unblocked by the impulse emitted by the trigger, 9 to short-circuit the capacitors 2 and 6. At this precise moment the two capacitances again have zero charge and a second cycle can begin. In this way a number of impulses is obtained at the output of the threshold trigger 9, the number of impulses being directly proportional to the square root of the current applied to the input terminal; the proportionality is obtained very accurately by so determining the value of the resistor 13 that the product of the resistance thereof and the capacitance of the condenser 6, which product has the dimension of time, is equal to the discharge time determined by the discharge circuit 11.

I claim:

1. A device for converting a signal into a frequency comprising, in combination, a first condenser, means for supplying to the first condenser a current proportional to the said signal, a differential amplifier having a first input connected to the first condenser and a generator adapted, in response to the differential voltage established at the output of the differential amplifier, to supply a current to a resistor connected to a second input of the differential amplifier, characterized in that the device further comprises a second condenser connected to the generator, so as to be charged by the latter, a threshold trigger connected across the second condenser to determine the charging voltage of the said second condenser, and two circuit elements to control discharge of the two condensers, the said circuit elements being connected across the terminals of the respective condensers and being adapted, in response to an impulse supplied by the trigger, to discharge the two condensers simultaneously, the frequency of the impulses thus supplied being proportional to the square root of the value of the input signal.

2. A device according to claim 1, in which a high value resistor is connected in the circuit constituted by the second condenser and the trigger, the said high-value resistor being calibrated in such manner that the product of the resistance thereof and the capacitance of the second condenser is equal to the time required for discharging the second condenser, which time is determined by the characteristics of the said circuit element which is connected across the terminals of the said second condenser.

References Cited

UNITED STATES PATENTS

| 3,231,766 | 1/1966 | Lowenstein | 328—144 X |
| 3,252,099 | 5/1966 | Dodd | 328—144 X |
| 3,328,569 | 6/1967 | Brewster | 328—144 X |

JOHN S. HEYMAN, Primary Examiner

U.S. Cl. X.R.

328—146; 330—30